United States Patent [19]

Geiger et al.

[11] Patent Number: 4,868,656
[45] Date of Patent: Sep. 19, 1989

[54] METHOD AND APPARATUS FOR REDUCING VISIBILITY OF SCANNING LINES IN TELEVISION PICTURE

[75] Inventors: Erich Geiger, Unterkirnach; Jean C. Guillon, Vinningen; Jean C. Rufray, Brigachtal, all of Fed. Rep. of Germany

[73] Assignee: Deutsche Thomson-Brandt GmbH, Hanover, Fed. Rep. of Germany

[21] Appl. No.: 211,591

[22] Filed: Jun. 27, 1988

[30] Foreign Application Priority Data

Jul. 4, 1987 [DE] Fed. Rep. of Germany ....... 3722170

[51] Int. Cl.$^4$ .............................................. H04N 7/01
[52] U.S. Cl. .................................. 358/140; 358/160; 358/166
[58] Field of Search ................... 358/140, 11, 160, 166

[56] References Cited

U.S. PATENT DOCUMENTS

| | | | |
|---|---|---|---|
| 4,415,931 | 11/1983 | Dischert | 358/242 |
| 4,449,149 | 5/1984 | Ogawa | 358/280 |
| 4,641,188 | 2/1987 | Dischert | 358/140 |
| 4,680,632 | 7/1987 | Willis | 358/140 |

FOREIGN PATENT DOCUMENTS

| | | |
|---|---|---|
| 3150599 | 8/1982 | Fed. Rep. of Germany . |
| 3128727 | 2/1983 | Fed. Rep. of Germany . |
| 3346458 | 6/1984 | Fed. Rep. of Germany . |
| 3625932 | 2/1987 | Fed. Rep. of Germany . |

*Primary Examiner*—Howard W. Britton
*Attorney, Agent, or Firm*—Spensley Horn Jubas & Lubitz

[57] ABSTRACT

A method and circuit arrangement for reducing the prominence of the scanning lines of an enlarged television picture by adding a plurality of scanning lines to an original television picture signal to form a modified picture signal, and supplying each added line with picture information from an adjoining one of the picture lines of the original television picture signal. This technique is applicable to television sets in which the pictures are stretched, in order for pictures having a different size and shape from that of the television screen to be shown in such a way that they fill the screen completely.

3 Claims, 3 Drawing Sheets

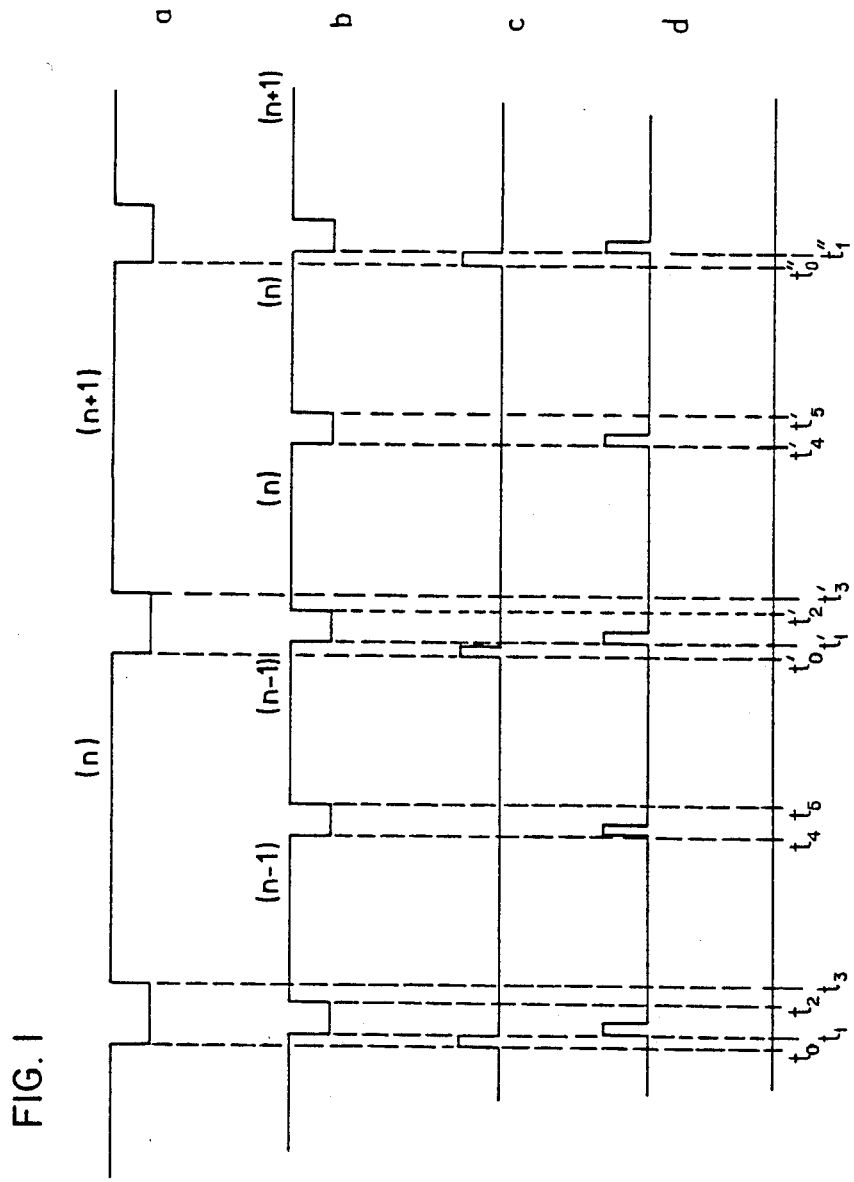

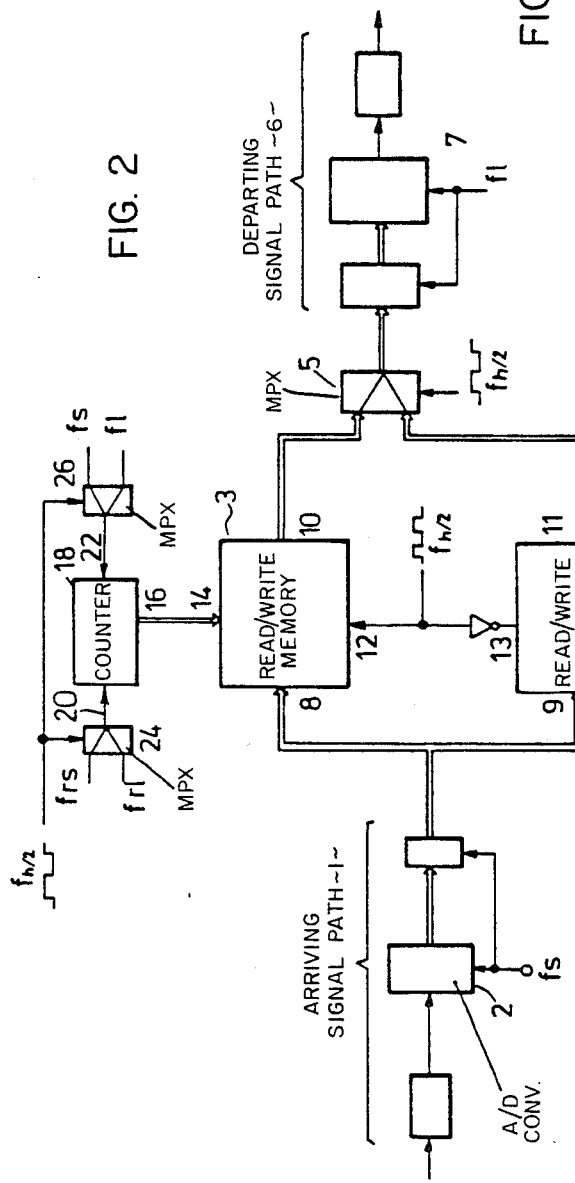
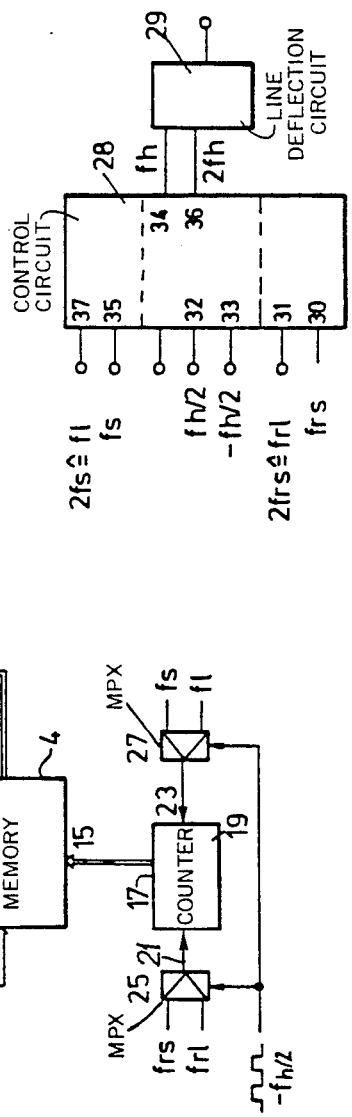

METHOD AND APPARATUS FOR REDUCING VISIBILITY OF SCANNING LINES IN TELEVISION PICTURE

BACKGROUND OF THE INVENTION

The present invention relates to a method and circuit arrangement for reducing the visibility of the scanning lines of an enlarged television picture.

At a normal viewing distance, the scanning lines of a television picture are not perceived as irritating. Technical provisions for enlarging a detail of a picture, which is done by increasing the amplitudes of the horizontal and vertical scanning signals, reduces the number of lines visible on the screen while increasing their distance apart, so that in this mode of operation the scanning line structure becomes visible, and hence annoying. This effect can also occur if a large-screen television set, such as a projection set, is viewed from a close distance.

SUMMARY OF THE INVENTION

It is an object of the present invention to reduce the visibility of the scanning lines of such an enlarged television picture, so that at least the same line structure as in an unenlarged television picture viewed from the same distance is apparent.

The above and other objects are achieved, according to the present invention, by a method for reducing the prominence of the scanning lines of an enlarged television picture, comprising: adding a plurality of scanning lines to an original television picture signal to form a modified picture signal; and supplying each added line with picture information from an adjoining one of the picture lines of the original television picture signal.

Preferably, the invention is implemented by doubling the number of lines of the picture and supplying two successive picture lines with the same picture content, or information. This solution is particularly simple to accomplish and allows stretching of the television picture vertically to twice its height, before the line structure is perceived as being irritating.

An advantageous procedure for performing this is for the picture content of each line, during transmission or reproduction from a memory, such as a recorder, to be temporarily stored first, and while the temporary storage is being effected, for the picture content of the preceding line to be shown twice in succession. This method entails only an imperceptible delay and in terms of circuitry requires little memory capacity.

The invention also relates to a circuit arrangement for reducing the visibility of the line structure of a television picture.

In this connection, its object is to provide a circuit arrangement which, at the least possible expense in terms of circuitry, creates a visual impression that is equivalent to that achieved with the usual number of lines for a television image.

This object is achieved by a circuit arrangement for reducing the prominence of the scanning lines of a television picture produced from an original picture signal having a defined line scanning frequency and number of picture lines, comprising: a line deflection circuit having a line scanning frequency higher than the defined line scanning frequency; a memory circuit for storing the picture content of at least one scanning line of the original picture signal; and a control circuit arrangement connected between the line deflection circuit and the memory circuit for causing the picture content of each scanning line of the original picture signal to be stored in the memory circuit and to then be read a plurality of times out of the memory circuit at a line scanning frequency corresponding to that of the line deflection circuit.

To produce a greater number of lines, all that is necessary is to change the dimension of the horizontal deflection circuit to a higher deflection frequency or to perform both dimensions, namely higher and normal deflection frequency, and to make the mode of operation reversible.

For supplying adjacent lines with the same picture content, a memory circuit is used that stores at least the content of one picture line, but preferably two picture lines. The picture content located in the memory circuit can then be read out a plurality of times in succession.

It is particularly suitable to provide two read-write memories, the data inputs of which are connected with an arriving picture signal line and the data outputs of which are connected via a reversing switch with an outgoing picture signal line. These read-write memories are controlled for performance of writing and reading operations in alternation, such that one readwrite memory is in the read mode when the other is in the write mode, after which their operating modes are interchanged. Further features and advantageous embodiments of the invention will become apparent from the following description and the drawing, which shows an exemplary embodiment of the subject of the invention.

BRIEF DESCRIPTION OF THE DRAWINGS

FIGS. 1a to 1d are waveform diagrams illustrating the operations of transmission, memory storage and reading according to an embodiment of the invention.

FIGS. 2 and 2a show a block circuit diagram of a preferred embodiment of a circuit arrangement in accordance with an exemplary embodiment of the invention.

DESCRIPTION OF THE PREFERRED EMBODIMENTS

Figure 3:
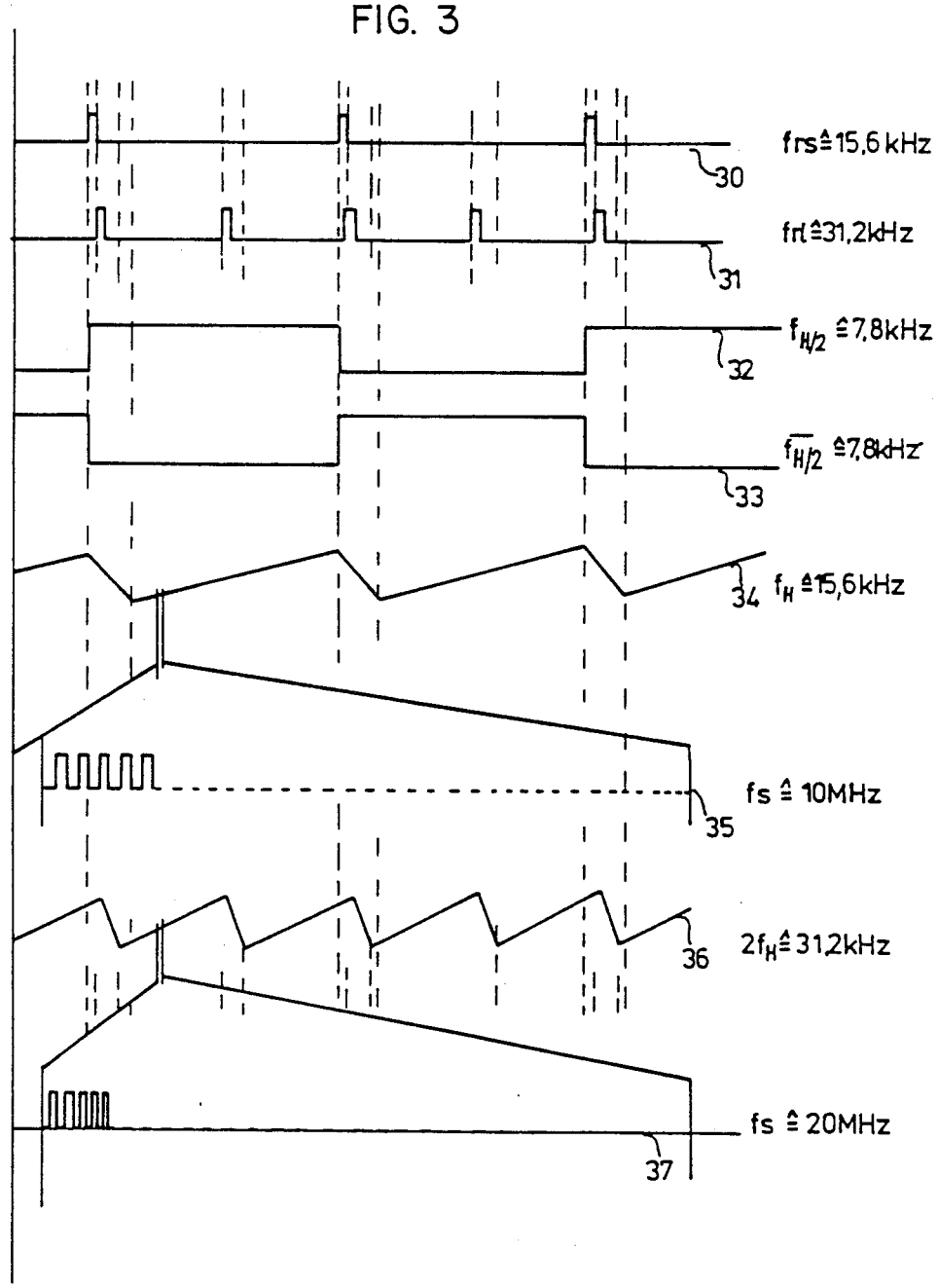
FIG. 3 is a waveform diagram illustrating the control signals of a control circuit.

FIG. 1a illustrates the time sequence of signals to be transmitted or reproduced for successive lines n, n+1, of a television picture. At viewing time $t_0$, a line return, or blanking, pulse begins, which terminates at time $t_3$. From time $t_3$ to time $t'_0$, line n is being transmitted to the receiver. With direct representation on the receiver screen, this line is displayed directly. At time $t'_0$, the line return, or blanking, pulse for the next succeeding line, n+1, begins. This line return pulse terminates at time $t'_3$, and the transmission of the picture content of line n+1 takes place from time $t'_3$ to time $t''_0$.

For the ensuing lines n+2, etc., the above-described events repeat accordingly.

As FIG. 1c shows, at time $t_0$, a reset pulse is also generated, which resets a memory, and at time $t_1$ the picture signals of line n start to be written into this memory. At time $t'_0$ a second memory is then reset, and between times $t'_2$ and $t''_0$ the picture content of line n+1 is written into this second memory. At time $t''_0$, the first memory is reset again, and the picture content of line n+2 is written into it.

This process repeats in alternation for the ensuing lines: the content of the even numbered lines is always written into the first memory, and the content of the odd numbered lines is always written into the second memory.

The representation of the stored picture content will become apparent from FIGS. 1b and 1d. Between times $t_1$ and $t'_1$, the picture content of the preceding line $n-1$ is read out twice and presented in two picture lines. This is accomplished after a line retrace pulse that begins at time $t_1$ and ends at time $t_2$ and the first of the two scanning lines lasts from time $t_2$ to time $t_4$. This process now repeats a second time, with a second line retrace pulse, beginning at time $t_4$ and ending at time $t_5$, and a second line scan which lasts from time $t_4$ to time $t'_1$. A corresponding counter, controlled for reading out, is reset, in order to perform this operation, at times $t_1$ and $t_4$, as FIG. 1d shows. Between times $t'_1$ and $t''_1$, only that memory into which the picture content was previously written is controlled to the "read" mode, and the process described above is repeated for the line n with this memory between times $t'_1$ and $t''_1$.

FIG. 2 is a block circuit diagram of an embodiment according to the invention. An arriving signal path 1 having an analog/digital converter 2 is routed to a first read-write memory 3 and a second read-write memory 4 and then, via a multiplexer 5, recombined in a departing signal path 6 having a digital/analog converter 7.

Each of read-write memories 3 and 4 has a data input 8 or 9, a data output 10 or 11, a read-write control input 12 or 13, and an address input 14 or 15. The address inputs 14 and 15 of the read-write memories 3 and 4 are connected to counting outputs 16 and 17 of address counters 18 and 19, respectively, and counters 18 and 19, in turn, have reset inputs 20 and 21 and clock inputs 22 and 23, respectively.

The reset inputs 20 and 21 are triggered via multiplexers 24 and 25 by signals from a control circuit 28, shown in FIG. 2a, and the clock inputs 22 and 23 are triggered by signals from this circuit 28 via multiplexers 26 and 27. A line deflection circuit 29 (FIG. 2a) is also connected to this control circuit 28 to receive control signals from there.

For the sake of simplicity, the individual control lines are not shown; instead, only the signals to the respective control input or output terminals are shown. The control signals are switching signals $f_{h/2}$ and $-f_{h/2}$, where $-f_{h/2}$ is the inverse signal of $f_{h/2}$.

Each switching signal has a rate equal to one half the line scanning rate, $f_h$, of the original television picture signal. These signals are symmetrical switching signals, and they vary their states after each line period of the transmitted or reproduced picture signal.

The switching signals serve to switch the read-write memories 3 and 4 over in alternation, via the control inputs 12 and 13, from the "write" mode to the "read" mode, and vice versa. The multiplexer 5 is also triggered so that during one line period of the original picture signal, the content of memory 8 is applied twice in succession via data output 10 to the departing signal path 6 and during the next line period of the original picture signal, the content of memory 9 is applied via data output 11 twice in succession to the departing signal path 6.

Finally, the multiplexers 24, 25, 26 and 27 are also switched with the switching signals.

The control signals frl and frs are reset signals for the counters 18 and 19 and correspond to the reset signals shown in FIGS. 1c and 1d at times $t_0$ (frs) and $t_1$, $t_4$ (frl), respectively, and in the corresponding following times.

The frequency of the reset signal frs corresponds in value to the line frequency of the television picture signal which is being supplied to the system, and the frequency of the signal frl corresponds in value to the line frequency of the converted picture. In this case, the frequency of the signal frl is twice as high as the frequency of frs.

Finally, clock signals are generated, which are delivered to the clock inputs 22 and 23 of the counters 18 and 19 via the multiplexers 26 and 27. These signals are clock signals fs for the "write" mode and fl for the "read" mode. The frequency of the clock signals corresponds to the number of picture elements, or pixels, of each line, multiplied by the particular line frequency. In the present case, the clock frequency of the signal fl is therefore twice as high as that of the signal fs.

Via the arriving signal path 1, the picture signals reach the data inputs 8 and 9 of the read-write memories 3 and 4 in digital form. It is assumed that at time $t_0$ the read-write memory 3 is in the "write" mode, and the memory 4 is in the "read" mode. Then multiplexer 24 is controlled such that it switches reset signals frs through to the reset input 20, and multiplexer 25 is controlled such that it switches the reset signal frl through to the input 21. Multiplexer 26 is also controlled such that it switches clock signals fs through to the clock input 22, and multiplexer 27 switches clock signals fl through to the clock input 23.

Next, the picture data of line n are written into the read-write memory 3, by addressing all the required memory locations in succession. In the read-write memory 4, the picture data of the preceding line $n-1$ have already previously been written, and these data are now read out twice in succession, beginning at time $t_1$, and delivered via multiplexer 5 to the departing signal path 6. In the time available between $t_1$ and $t'_0$, the memory locations in the read-write memory 4 are addressed in two matching cycles, or in other words the picture signals are read out twice.

Next, read-write memories 3 and 4 are both switched to the respective other mode, and in other words the previously stored picture signals are now read out of read-write memory 3, while the picture data of the line now being transmitted or played back are written into read-write memory 4. The previously stored picture data are lost in this process. In order to switch the output 10 of read-write memory 3 to the departing signal path 6, multiplexer 5 is switched over. This process as described is now repeated after each line period of the transmitted or played back picture signal.

The control circuit 28 generates control signals at the output terminals 30 to 37 the run of their curves and their frequencies are shown in FIG. 3.

The invention now being fully described, it will be apparent to one of ordinary skill in the art that many changes and modifications can be made thereto without departing from the spirit or scope of the invention as set forth herein.

What is claimed is:

1. A circuit arrangement for reducing the prominence of the scanning lines of a television picture produced from an original picture signal having a defined line scanning frequency and number of picture lines, each scanning line of the original television picture signal having a given number of picture elements, comprising: an arriving picture signal line for conducting the original picture signal and an outgoing picture signal line; a line deflection circuit having a line scanning frequency which is twice the defined line scanning frequency; a memory circuit for storing the picture content of at least one scanning line of the original picture signal; and a control circuit arrangement connected between said line deflection circuit and said memory circuit for causing the picture content of each scanning line of the original picture signal to be stored in said memory circuit and to then be read a plurality of times out of said memory circuit at a line scanning frequency corresponding to that of said line deflection circuit, and wherein said memory circuit comprises: two read-write memories each having an address input, a data input connected to said arriving picture signal line, a data output and a read-write control input connected to receive a control signal having a frequency equal to one-half the defined line frequency; switching means connected for coupling said data outputs in alternation to said outgoing picture signal line; and two counters each having a count capacity equal to the given number of picture elements, a clock input for receiving clock signals to be counted and a count output connected to said address input of a respective memory for supplying a count signal representative of the number of clock signals applied to said clock input, and further wherein: said read-write control inputs are connected to said control circuit arrangement to receive signals which cause said memories to read and write in mutual alternation; and said control circuit arrangement is connected to supply to said clock input of each said counter a first clock signal at a rate equal to the given number of picture elements multiplied by the defined line scanning frequency when the memory associated with that counter is in its write mode and a second clock signal at a rate equal to the given number of picture elements multiplied by the higher line scanning frequency of said line deflection circuit when the memory associated with that counter is in its read mode.

2. A circuit arrangement as defined in claim 1 wherein the rate of the second clock signal is twice the rate of the first clock signal.

3. A circuit arrangement for reducing the prominence of the scanning lines of a television picture produced from an original picture signal having a defined line scanning frequency and number of picture lines, each scanning line of the original television picture signal having a given number of picture elements, comprising: an arriving picture signal line for conducting the original picture signal and an outgoing picture signal line; a line deflection circuit having a line scanning frequency which is higher the defined line scanning frequency; a memory circuit for storing the picture content of at least one scanning line of the original picture signal; and a control circuit arrangement connected between said line deflection circuit and said memory circuit for causing the picture content of each scanning line of the original picture signal to be stored in said memory circuit and to then be read a plurality of times out of said memory circuit at a line scanning frequency corresponding to that of said line deflection circuit, and wherein said memory circuit comprises: two read-write memories each having an address input, a data input connected to said arriving picture signal line, a data output and a read-write control input connected to receive a control signal having a frequency equal to one-half the defined line frequency; switching means connected for coupling said data outputs in alternation to said outgoing picture signal line; and two counters each having a count capacity equal to the given number of picture elements, a clock input for receiving clock signals to be counted and a count output connected to said address input of a respective memory for supplying a count signal representative of the number of clock signals applied to said clock input, and further wherein: said read-write control inputs are connected to said control circuit arrangement to receive signals which cause said memories to read and write in mutual alternation; and said control circuit arrangement is connected to supply to said clock input of each said counter a first clock signal at a rate equal to the given number of picture elements multiplied by the defined line scanning frequency when the memory associated with that counter is in its write mode and a second clock signal at a rate equal to the given number of picture elements multiplied by the higher line scanning frequency of said line deflection circuit when the memory associated with that counter is in its read mode.

* * * * *